United States Patent
Shivalinga et al.

(10) Patent No.: US 11,851,195 B2
(45) Date of Patent: Dec. 26, 2023

(54) SHAPE MEMORY ALLOY BASED SPRING ACTIVATED BALL LOCK AND ACTUATOR PIN RELEASE SYSTEMS AND METHODS

(71) Applicant: GOODRICH CORPORATION, Charlotte, NC (US)

(72) Inventors: Vinod Kumar Shivalinga, Bangalore (IN); Vasantha Kumara Jnanegowda, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/857,943

(22) Filed: Jul. 5, 2022

(65) Prior Publication Data
US 2023/0278712 A1    Sep. 7, 2023

(30) Foreign Application Priority Data

Mar. 7, 2022    (IN) .............................. 202241012188

(51) Int. Cl.
*B64D 25/14*    (2006.01)
*F03G 7/06*    (2006.01)

(52) U.S. Cl.
CPC ............ *B64D 25/14* (2013.01); *F03G 7/064* (2021.08); *F03G 7/0631* (2021.08); *F03G 7/06145* (2021.08)

(58) Field of Classification Search
CPC ... B64D 25/14; F03G 7/06145; F03G 7/0631; F03G 7/064
See application file for complete search history.

(56) References Cited

U.S. PATENT DOCUMENTS

| | | | |
|---|---|---|---|
| 6,126,115 A | 10/2000 | Carrier et al. | |
| 7,219,687 B2 | 5/2007 | Vasquez et al. | |
| 7,380,755 B2 | 6/2008 | Matsch | |
| 8,919,699 B2 * | 12/2014 | Kress | B64C 1/1407 244/129.4 |
| 9,112,307 B2 | 8/2015 | Leroyer et al. | |
| 10,472,076 B2 | 11/2019 | Schmidt et al. | |
| 2003/0128491 A1 * | 7/2003 | Bueno Ruiz | B64G 1/645 361/115 |

(Continued)

FOREIGN PATENT DOCUMENTS

WO    1992014083    8/1992

OTHER PUBLICATIONS

European Patent Office, European Search Report dated Jul. 18, 2023 in Application No. 23160286.3.

*Primary Examiner* — Hoang M Nguyen
(74) *Attorney, Agent, or Firm* — SNELL & WILMER L.L.P.

(57) ABSTRACT

A release system for an evacuation slide assembly of an aircraft includes a first actuator and in various embodiments a second actuator. The first actuator and the second actuator each comprise an SMA spring configured to be electrically energized for actuating the first and second actuators in response to an evacuation event. In various embodiments, the first actuator is configured to release a blowout panel of the evacuation slide assembly in response to the first SMA spring being electrically energized. In various embodiments, the second actuator is configured to release a soft cover of the evacuation slide assembly in response to the second SMA spring being electrically energized.

20 Claims, 13 Drawing Sheets

(56) References Cited

U.S. PATENT DOCUMENTS

| | | | |
|---|---|---|---|
| 2008/0217927 A1* | 9/2008 | Browne | F16D 63/006 292/28 |
| 2008/0277946 A1* | 11/2008 | Rudduck | E05B 47/0009 292/3 |
| 2013/0160445 A1 | 6/2013 | Olson et al. | |
| 2018/0210483 A1* | 7/2018 | Santiago | B64D 25/16 |
| 2019/0009914 A1 | 1/2019 | Schmidt et al. | |
| 2021/0018023 A1 | 1/2021 | Kuppan | |

* cited by examiner

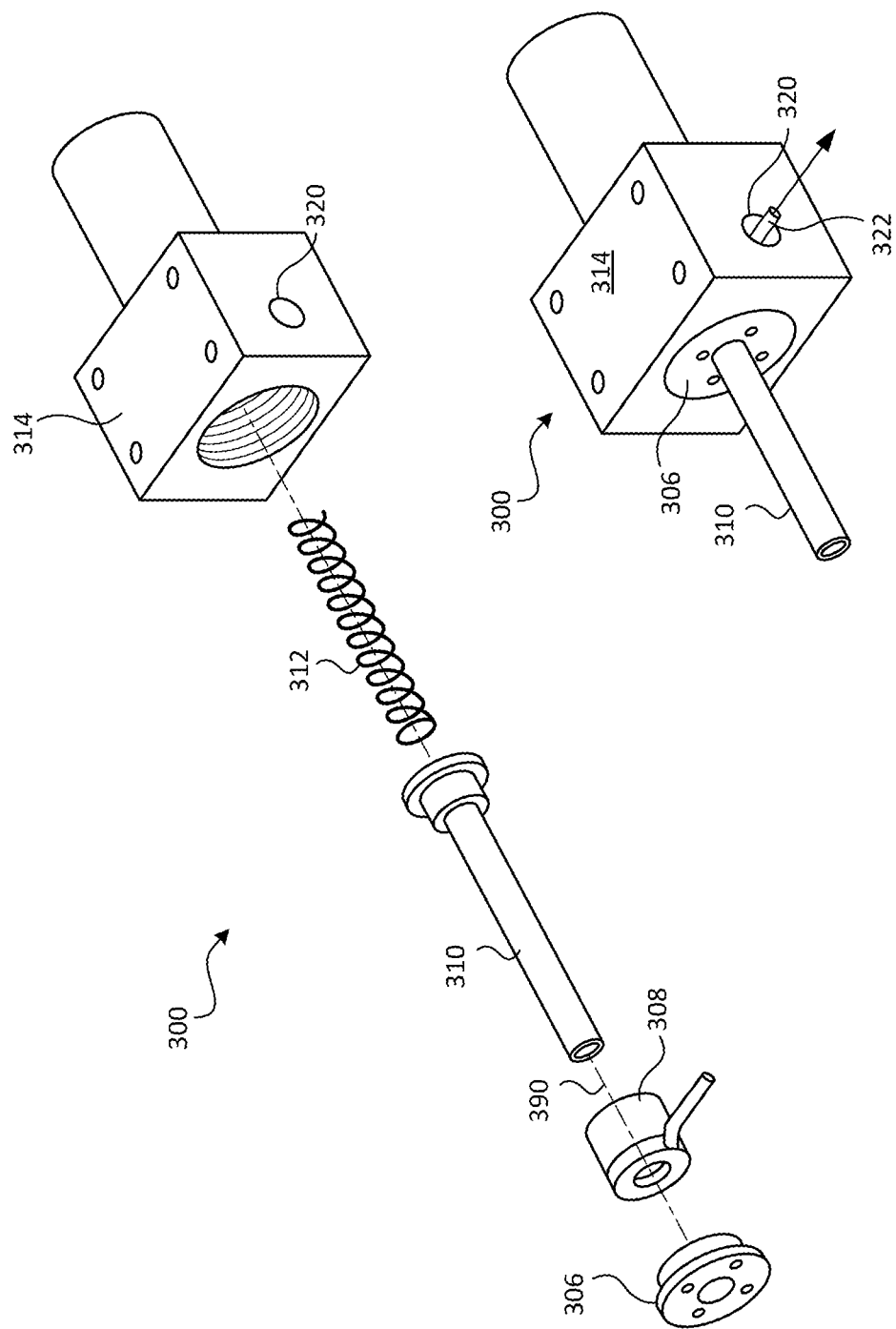

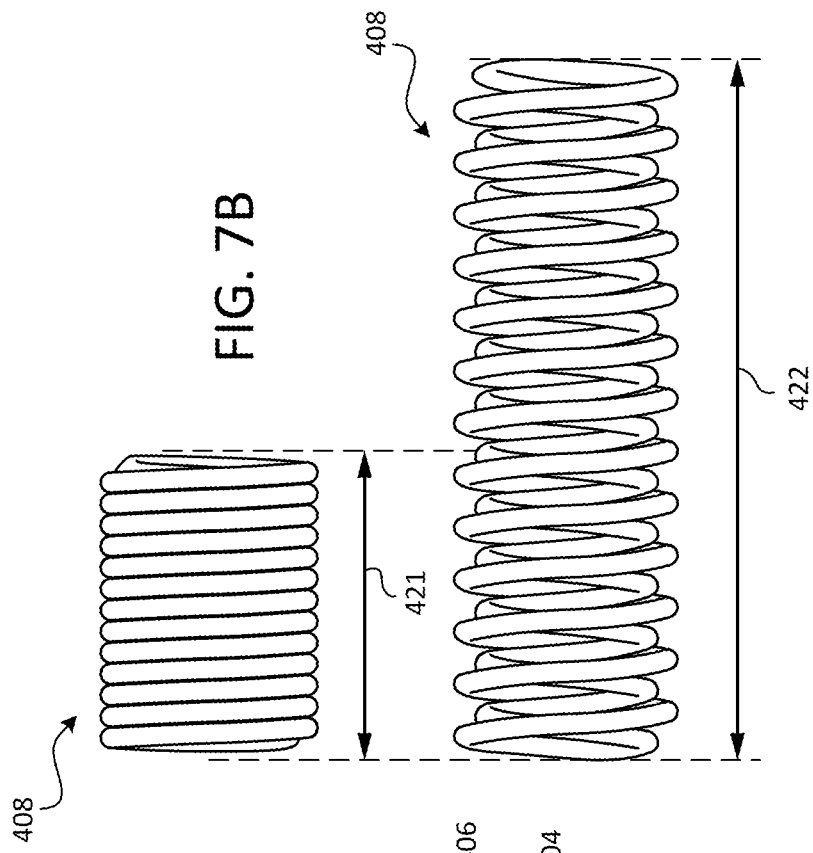
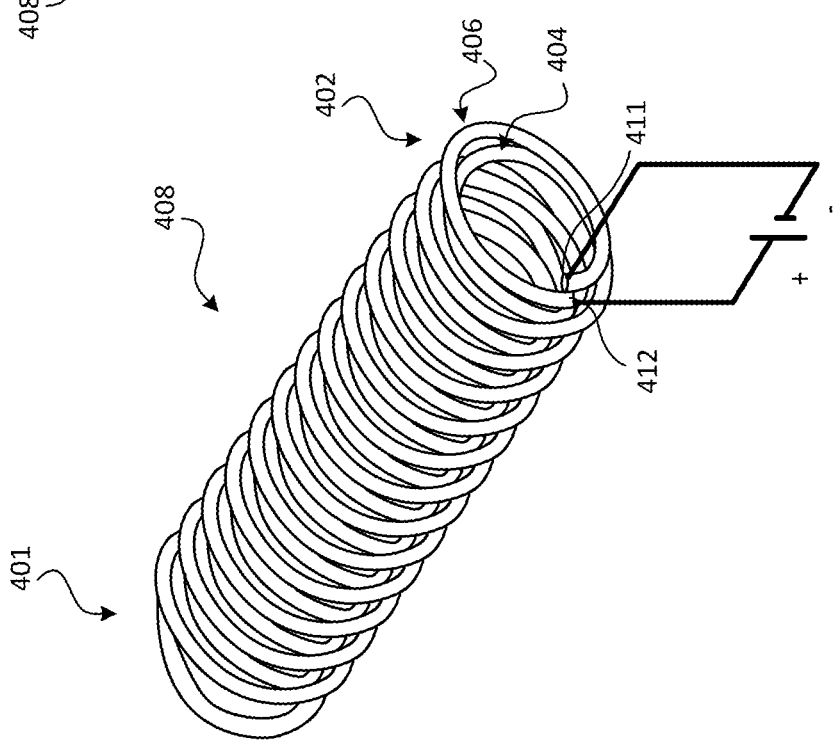

SHAPE MEMORY ALLOY BASED SPRING ACTIVATED BALL LOCK AND ACTUATOR PIN RELEASE SYSTEMS AND METHODS

CROSS-REFERENCE TO RELATED APPLICATIONS

This application claims priority to, and the benefit of, India Patent Application No. 202241012188, filed Mar. 7, 2022 (DAS Code 3ED8) and titled "SHAPE MEMORY ALLOY BASED SPRING ACTIVATED BALL LOCK AND ACTUATOR PIN RELEASE SYSTEMS AND METHODS," which is incorporated by reference herein in its entirety for all purposes.

FIELD

The present disclosure relates to aircraft evacuation assemblies for aircraft, and, more specifically, to release systems for evacuation slides.

BACKGROUND

An evacuation slide assembly may include an inflatable slide that helps passengers disembark from an aircraft in the event of an emergency or other evacuation event. Conventionally, deployment of the inflatable slide generally includes multiple release assemblies configured to facilitate the release of the inflatable slide from its stored position on the aircraft. For example, inflatable slides may be generally stored within a soft cover that is disposed within a container, such as a packboard.

SUMMARY

In various embodiments, a release system for an evacuation slide assembly of an aircraft is disclosed herein. The release system may include a blowout panel and a first actuator comprising a first housing, a first shape memory alloy spring, a first compression spring, and a first spindle. The first shape memory alloy spring is configured to bias the first spindle to retract into the first housing in response to being electrically energized to deploy the blowout panel.

In various embodiments, the release system further comprises a power source, wherein the first shape memory alloy spring is configured to be electrically energized in response to an evacuation event.

In various embodiments, the release system further comprises a soft cover and a second actuator comprising a second housing, a second shape memory alloy spring, a second compression spring, and a second spindle. The second shape memory alloy spring may be configured to bias the second spindle to retract into the second housing in response to being electrically energized to deploy the soft cover.

In various embodiments, the release system further comprises a control unit, a first switch coupled between the power source and the first actuator, and a second switch coupled between the power source and the second actuator. The control unit may be configured to close the first switch and the second switch in response to the evacuation event to energize the first SMA spring and the second SMA spring.

In various embodiments, the first actuator is a ball lock, the first actuator further comprising a ball bearing, and the first shape memory alloy spring is configured to bias the first spindle away from the ball bearing in response to being electrically energized.

In various embodiments, the first actuator further comprises a frangible rod configured to extend through the first spindle.

In various embodiments, the first actuator further comprises a first nose fitting coupled to the first housing, wherein the first shape memory alloy spring is disposed in a first main chamber of the first housing, the first shape memory alloy spring is disposed between a first flange of the first spindle and the first nose fitting.

In various embodiments, in a locked state, the first actuator is configured to secure the blowout panel, and in response to being electrically energized, the first actuator is configured to transition to an unlocked state to release the blowout panel.

In various embodiments, in a locked state, the second actuator is configured to retain an evacuation slide enclosed within the soft cover, and in response to being electrically energized, the second actuator is configured to transition to an unlocked state to allow release of the evacuation slide from enclosure within the soft cover.

In various embodiments, the second actuator is configured to release a key-loop of a lacing to allow the lacing to unfurl.

An evacuation slide assembly of an aircraft is disclosed, the evacuation slide assembly comprising an evacuation slide mounted to the aircraft, a charged tank fluidly coupled to the evacuation slide, wherein fluid is configured to flow from the charged tank to the evacuation slide in response to an evacuation event, a power source, a blowout panel for retaining the evacuation slide, a first actuator comprising a first shape memory alloy spring configured to be electrically energized by the power source, wherein the first actuator is configured to release the blowout panel in response to a first electric current flowing from the power source to the first shape memory alloy spring, a soft cover for retaining the evacuation slide, and a second actuator comprising a second shape memory alloy spring configured to be electrically energized by the power source, wherein the second actuator is configured to release the soft cover in response to a second electric current flowing from the power source to the second shape memory alloy spring.

In various embodiments, the evacuation slide assembly further comprises a packboard mounted to the aircraft, wherein the packboard comprises a packboard compartment.

In various embodiments, the evacuation slide is mounted to the packboard.

In various embodiments, the blowout panel extends across an opening of the packboard compartment, wherein the first actuator, in a first locked state, secures the blowout panel relative to the packboard to retain the evacuation slide within the packboard compartment.

In various embodiments, the soft cover is disposed within the packboard compartment and comprises lacing, wherein the second actuator, in a second locked state, retains the evacuation slide within the soft cover.

In various embodiments, the evacuation slide assembly further comprises a valve for controlling flow of the fluid from the charged tank.

In various embodiments, the first actuator further comprises a first housing, a first compression spring, and a first spindle, wherein the first shape memory alloy spring surround the first spindle and abuts a flange of the first spindle.

A method of deploying an evacuation slide of an aircraft is disclosed, the method comprising flowing fluid from a fluid source to the evacuation slide, actuating a first actuator by flowing electrical current from a power source to a first shape memory alloy spring of the first actuator to release a blowout panel, and actuating a second actuator by flowing electrical current from the power source to a second shape memory alloy spring of the second actuator to release a soft cover.

In various embodiments, flowing the fluid from the fluid source to the evacuation slide, actuating the first actuator, and actuating the second actuator occur substantially simultaneously in response to an evacuation event.

In various embodiments, in response to flowing electrical current from the power source to the first shape memory alloy spring, the first shape memory alloy spring is configured to bias a first spindle to retract into a first housing.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 6A illustrates an SMA spring-activated actuator, in accordance with various embodiments;

FIG. 6B illustrates an isometric view of the actuator of FIG. 6A, in accordance with various embodiments;

FIG. 7A illustrates a perspective view of an SMA spring schematically coupled to a power source, in accordance with various embodiments;

FIG. 7B and FIG. 7C illustrate the SMA spring of FIG. 7A in a non-electrically energized state and an electrically energized state, respectively, in accordance with various embodiments.

Figure 1:
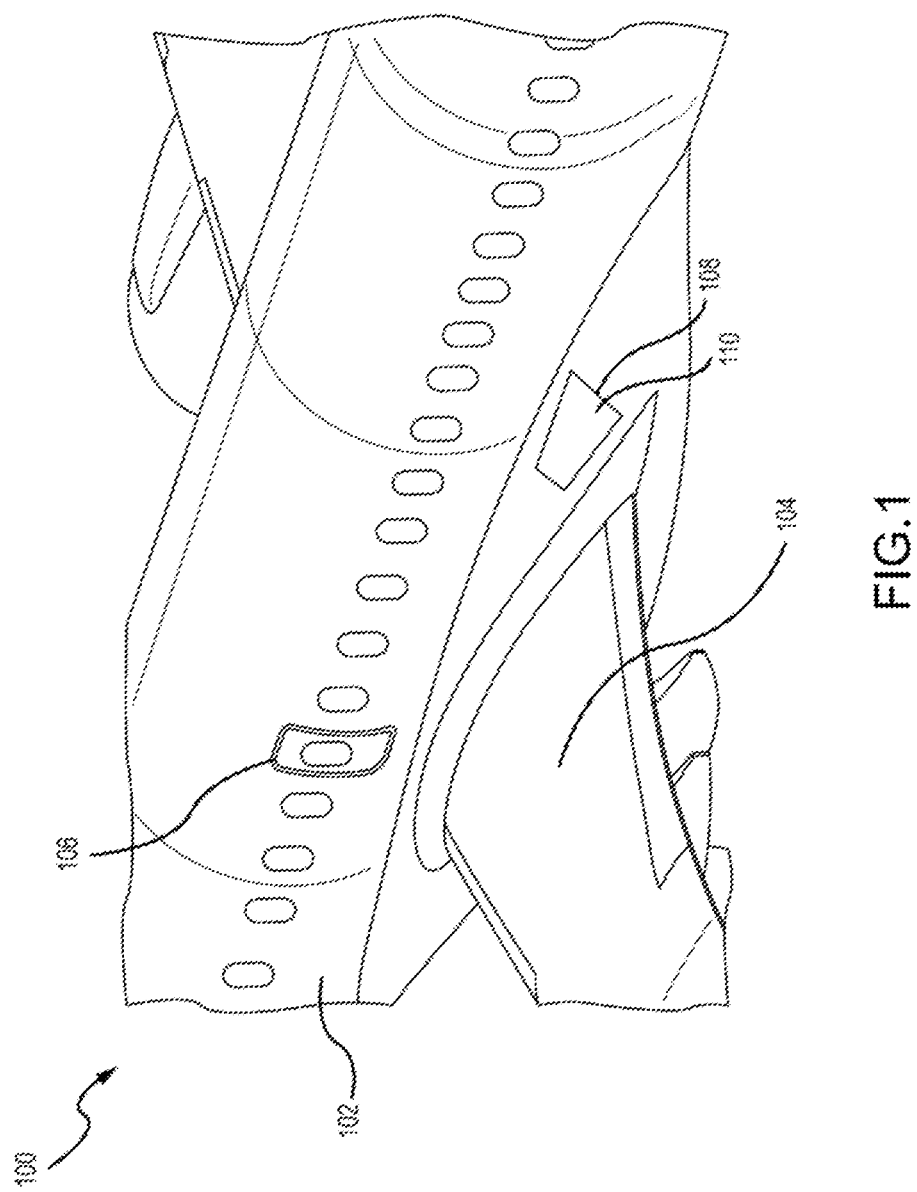
FIG. 1 illustrates a perspective view of an evacuation slide assembly of an aircraft, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

A release system for an evacuation slide of the present disclosure may include an electrically activated actuator comprising a SMA (shape memory alloy) spring. By providing an electrically activated actuator (as opposed to a pneumatically actuated actuator), additional pressurized gas is not used to operate the ball locks and actuator pin to release the cover (blowout) panel and soft cover. A release system of the present disclosure may reduce the weight and cost of the packboard assembly compared to existing designs as the number of components may be reduced. A release system of the present disclosure may be implemented in gas free/electrified inflation slide/raft deployment systems. A release system of the present disclosure may not utilize activate/de active keys to lock and unlock the ball lock assembly to open and close the cover (blowout) panel during maintenance. A release system of the present disclosure may be integrated with existing designs without impacting the frangible rod function. A release system of the present disclosure may avoid complicated regulator valve design as no pressurized gas is utilized to release the ball locks and actuator pin. By using electrically activated actuators, secondary operations related to ball lock and actuator pin gas delivery manifold tube routings on the packboard shell of various existing designs is not necessary.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation slide assembly 108 may be disposed aft of emergency exit door 106. Blowout panel 110 may cover evacuation slide assembly 108 when installed on the aircraft 100. In various embodiments, the evacuation slide assembly 108 may include and/or be housed within a packboard mounted to the aircraft 100.

The evacuation slide assembly 108 may jettison the blowout panel 110 and deploy an evacuation slide 122 (FIG. 3), such as an inflatable slide, in response to emergency exit door 106 opening or in response to another evacuation event. The evacuation slide 122 may be packed within and otherwise stored and/or retained within a soft cover 120 (FIG. 3). As described in greater detail below, the evacuation slide assembly 108 may include a release system 101 (FIG. 2) that facilitates the deployment of the evacuation slide 122 and the release of both the blowout panel 110 and the soft cover 120. In various embodiments, as described in greater detail below, the release system 101 may be actuated using a power source, such as an electrical power source. In various embodiments, actuation of the release system 101, and thus deployment of the evacuation slide 122 and the deployment/ release of both the blowout panel 110 and the soft cover 120, may be electrically actuated.

Figure 2:
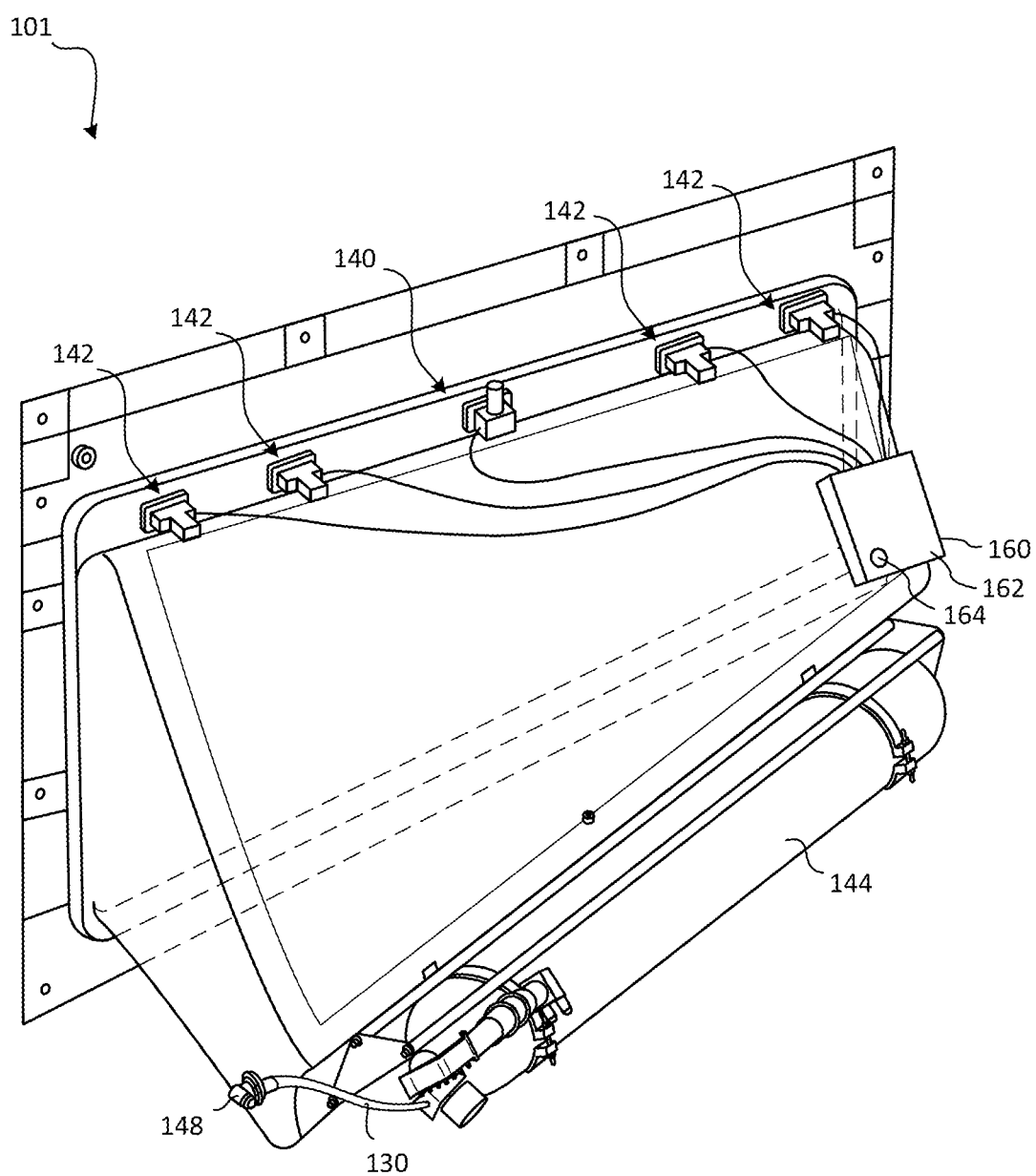
FIG. 2 illustrates a perspective view of a release system of an evacuation slide assembly of an aircraft, in accordance with various embodiments.
Figure 3:
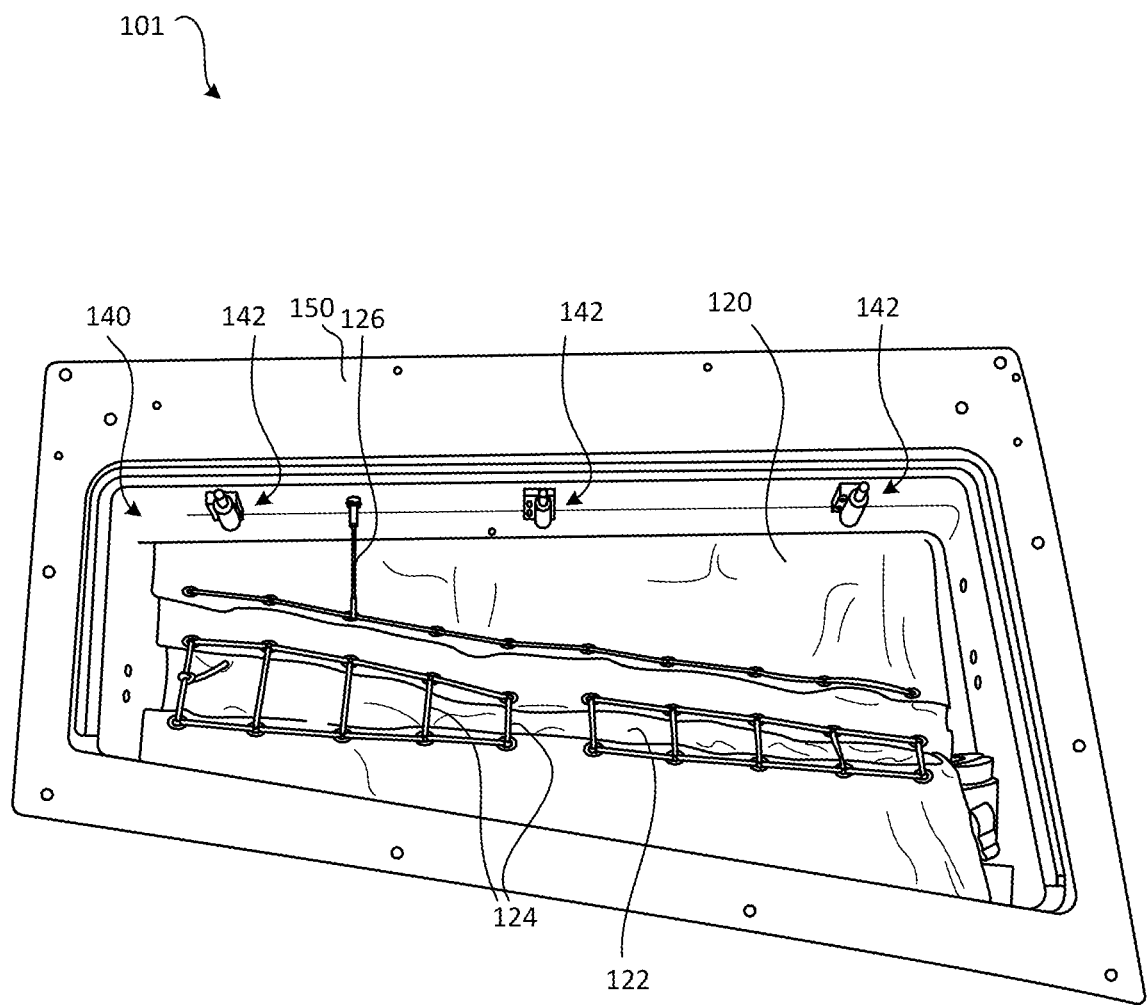
FIG. 3 illustrates a perspective view of a release system of an evacuation slide assembly of an aircraft, in accordance with various embodiments.

With reference to FIG. 2, the release system 101 of the evacuation slide assembly 108 is shown, as viewed from an inboard perspective, in accordance with various embodiments. The evacuation slide assembly 108 may include and/or may be housed within a packboard 150. The release system 101 may include a fluid delivery manifold 130. The fluid delivery manifold 130 may be capable of being fluidly coupled or fluidly coupled to a fluid source, such as a charged tank 144 of fluid. The charged tank 144 may be mounted to the back of the packboard 150. In various embodiments, the charged tank 144 may contain a compressed fluid. For example, the charged tank 144 may be a pneumatic gas cylinder and flow of the compressed fluid from the charged tank 144 may actuate a portion of the release system 101. In various embodiments, the fluid delivery manifold 130 may route fluid from the charged tank 144 to the evacuation slide to inflate the slide in response to an evacuation event. The charged tank 144 may provide pressurized gas to inflate the evacuation slide 122.

The fluid delivery manifold 130 may include piping and/or tubes through which the fluid from charged tank 144 flows. The fluid delivery manifold 130 may include and/or be fluidly coupled to a valve 148. The valve 148 may control flow of fluid from the charged tank 144 to the evacuation slide 122, in accordance with various embodiments. In various embodiments, valve 148 may be, for example, electrically actuated in response to the emergency exit door 106 opening and/or in response to an evacuation event. However, it is contemplated herein that valve 148 may be actuated (i.e., opened) via any suitable method (e.g., mechanically actuated, pneumatically actuated, electrically actuated, etc.) in response to the emergency exit door 106 opening and/or in response to an evacuation event.

In various embodiments, the release system 101 further includes an actuator 142 (also referred to herein as a blowout panel actuator, an SMA spring-activated actuator, a ball lock, and/or a first actuator) and an actuator 140 (also referred to herein as a soft cover actuator, an SMA spring-activated actuator, an actuator pin, a piston actuator, and/or a second actuator). Blowout panel actuator 142 and/or soft cover actuator 140 may be electrically actuated. In various embodiments, the release system 101 further includes a power source 160. The blowout panel actuator 142, according to various embodiments, is electrically coupled to a power source 160 and may be configured to release the blowout panel 110 of the evacuation slide assembly 108 in response to the evacuation event and/or in response to electrical current flowing into the blowout panel actuator 142.

In various embodiments, power source 160 comprises a battery, a capacitor, or any other suitable power source capable of electrically energizing blowout panel actuator 142. In various embodiments, the release system 101 further includes a control unit 162 configured to regulate electric power supplied by the power source 160. In various embodiments, the control unit 162 includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 162 controls, at least various parts of, and operation of various components of, the release system 101.

The blowout panel actuator 142, in accordance with various embodiments, is configured to release the blowout panel 110 of the evacuation slide assembly 108 in response to being electrically energized. That is, according to various embodiments, the blowout panel 110 may be at least partially retained in place by the blowout panel actuator 142 until an evacuation event and/or until the blowout panel actuator 142 is electrically energized by power source 160. In response to the evacuation event and/or blowout panel actuator 142 being electrically energized (e.g., electrical current flowing into the blowout panel actuator 142 from power source 160), the blowout panel actuator 142 may release the blowout panel 110, thus allowing the blowout panel 110 to be jettisoned, in accordance with various embodiments. In various embodiments, the act of jettisoning of the blowout panel 110 may be accomplished indirectly via inflation of the evacuation slide.

In various embodiments, the blowout panel actuator 142 may include multiple actuators spaced apart from each other and distributed along a length of the packboard 150. In various embodiments, the blowout panel actuator or blowout panel actuators 142 may be ball locks. The ball locks may engage a lip or other surface of the blowout panel 110 and thus may securely retain, or at least facilitate retaining, the blowout panel 110 in place over an opening to the packboard compartment. In response to the blowout panel actuator or blowout panel actuators 142 being electrically energized, the electrical energy may activate the blowout panel actuator or blowout panel actuators 142 to release the blowout panel 110.

The release system 101 may further include a manual switch 164 for manually operating blowout panel actuator 142, for example during a maintenance and/or repair procedure. Manually manipulating manual switch 164 may cause blowout panel actuator 142 to be electrically energized by power source 160. Additional details pertaining to the blowout panel actuator 142 are included herein with reference to FIG. 5A through FIG. 5E.

In various embodiments, the release system 101 further includes a soft cover actuator 140 which may be electrically actuated. The soft cover actuator 140, according to various embodiments, is electrically coupled to the power source 160 and may be configured to release the soft cover 120 of the evacuation slide assembly 108 in response to the evacuation event and/or in response to electrical current flowing into the soft cover actuator 140. Additional details pertaining to the soft cover actuator 140 are included herein with reference to FIG. 3 and FIG. 6A through FIG. 6D.

With reference to FIG. 3, the evacuation slide assembly 108 may comprise soft cover 120 containing evacuation slide 122. Soft cover 120 may have lacing 124 to enclose soft cover 120 and to retain the evacuation slide 122. Lacing 124 may be in a daisy chain or speed lacing configuration. The lacing 124 may have a key-loop that, once released or unlocked, allows the remainder of the lacing 124 to be unfurled. Thus, in response to releasing the key-loop, the evacuation slide 122 may be released (or may at least be releasable).

In various embodiments, the soft cover actuator 140 may be coupled to the lacing 124 and actuation of the soft cover actuator 140, in response to being electrically energized, may unlock the key-loop or other such feature of the lacing 124, thereby allowing the lacing 124 to be unfurled. In various embodiments, the lacing 124 may include a pin that locks the key-loop. The pin may be slidably coupled to the lacing 124 and may be coupled to the soft cover actuator 140. Movement of the soft cover actuator 140 may cause the pin to move, thus unlocking the lacing 124. In various embodiments, the soft cover actuator 140 may be an electrically drivable actuator pin, as described herein in further detail.

Figure 4:
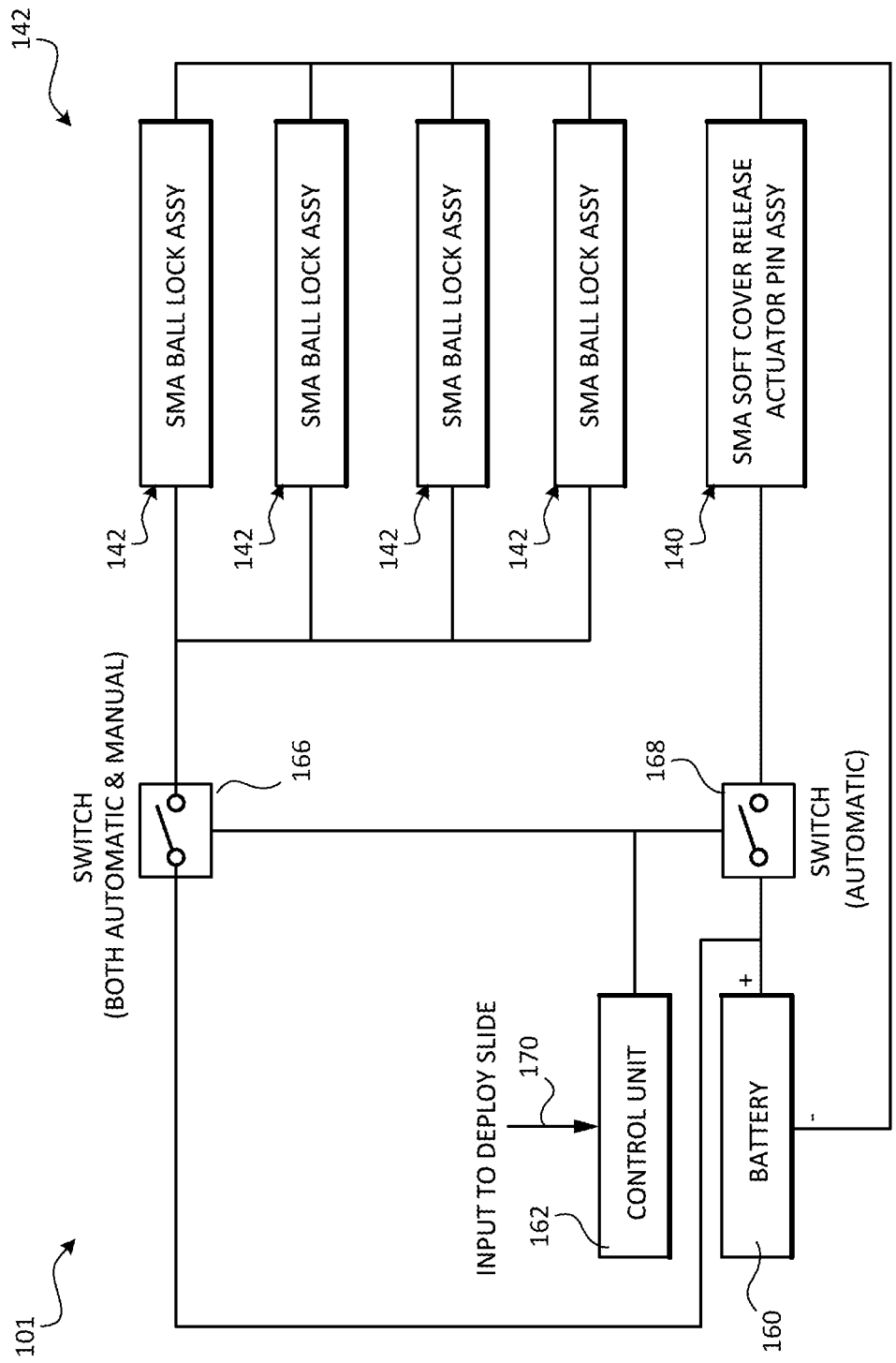
FIG. 4 illustrates a circuit diagram of a release system of an evacuation slide assembly of an aircraft, in accordance with various embodiments.

With reference to FIG. 4, a schematic view of the release system 101 is illustrated, in accordance with various embodiments. Control unit 162 may receive an input signal 170 in response to the emergency exit door 106 opening and/or in response to an evacuation event. Input signal 170 may be received via a wired or wireless connection. In various embodiments, input signal 170 is received from a door position sensor. In various embodiments, input signal 170 is received from an onboard controller configured to indicate to release system 101 to deploy the emergency slide. In response to input signal 170, control unit 162 may cause switch 166 and/or switch 168 to close to energize blowout panel actuator 142 and/or soft cover actuator 140 with power source 160.

In various embodiments, switch 166 may be manually (e.g., via manual switch 164) and/or electronically (e.g., via control unit 162) opened and closed. In this regard, switch 166 may be referred to herein as a manual switch and/or an automatic switch. Moreover, it is contemplated herein that switch 166 may be separated into two separate switches; one automatic switch and one manual switch, both of which are individually and/or independently operable to close the power supply circuit to blowout panel actuator 142.

In various embodiments, switch 168 may be electronically opened and closed to close the power supply circuit to soft cover actuator 140. In various embodiments, control unit 162 operates switch 166 and switch 168 simultaneously or substantially simultaneously to release blowout panel 110 and soft cover 120, respectively.

With reference to FIG. 5A through FIG. 5E, a ball lock actuator 200 is illustrated, in accordance with various embodiments. Blowout panel actuator 142 (see FIG. 2) may be similar to ball lock actuator 200, in accordance with various embodiments. Ball lock actuator 200 may include a frangible rod 202, at least one ball bearing 204, a nose fitting 206, a SMA spring 208, a spindle 210, a compression spring 212, and a housing 214.

In various embodiments, frangible rod 202 is coupled to housing 214 via a fastener 216. In various embodiments, fastener 216 is a threaded nut threadingly coupled to frangible rod 202. A lock washer 218 may be provided to secure nut fastener 216 with respect to frangible rod 202.

Housing 214 may comprise a passage 220 for receiving electrical wire 222. Electrical wire 222 may carry electrical current from power source 160 (see FIG. 2) to SMA spring 208. In this manner, SMA spring 208 may vary in length in response to being electrically energized to translate spindle 210 along longitudinal axis 290 with respect to nose fitting 206 and housing 214 to actuate ball lock actuator 200 between a locked state (see FIG. 5D) and an unlocked state (see FIG. 5E).

Figure 5A:
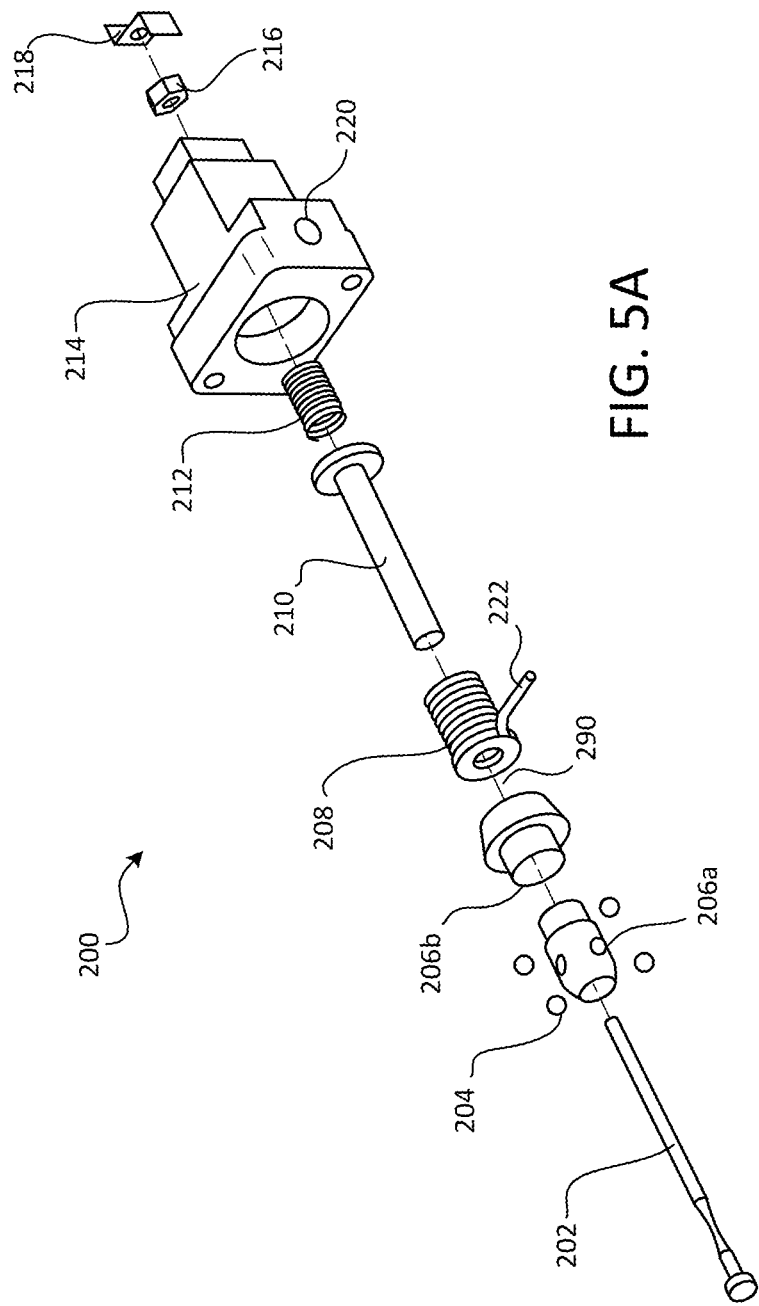
FIG. 5A illustrates an assembly view of an SMA spring-activated actuator, in accordance with various embodiments.
Figure 5B:
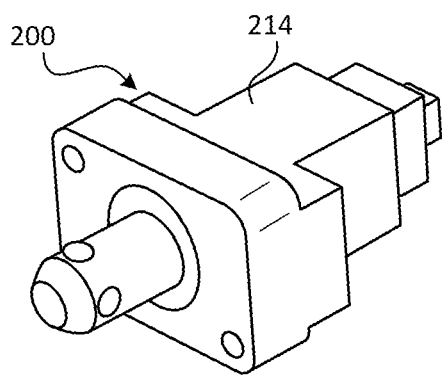
FIG. 5B and FIG. 5C illustrate isometric and side views, respectively, of the actuator of FIG. 5A, in accordance with various embodiments.
Figure 5C:
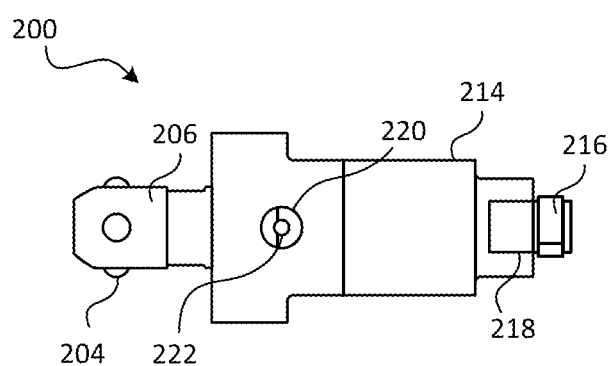
Figure 5D:
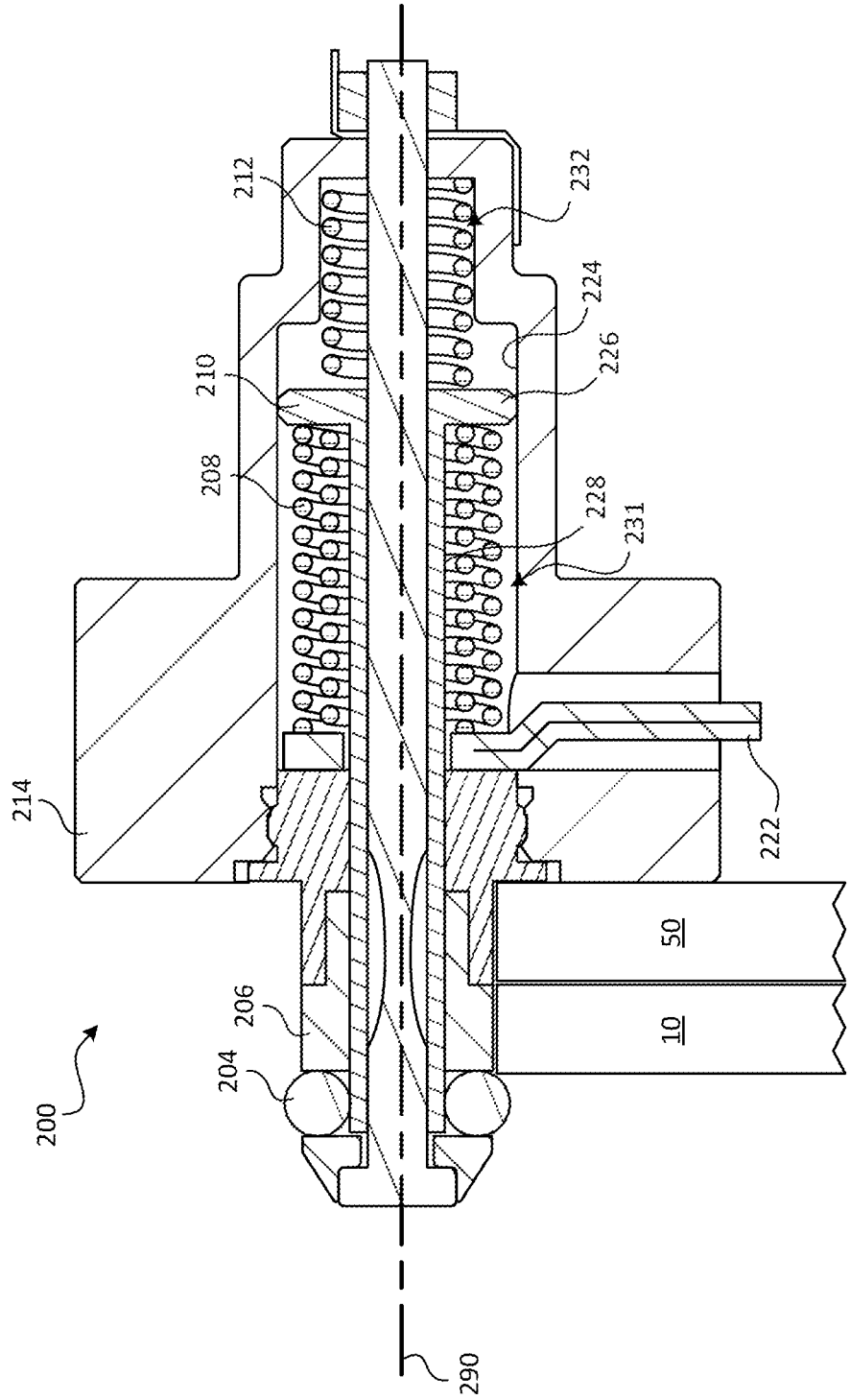
FIG. 5D illustrates a section view of the actuator of FIG. 5A in a locked stated with the spindle in an extended position, in accordance with various embodiments.
Figure 5E:
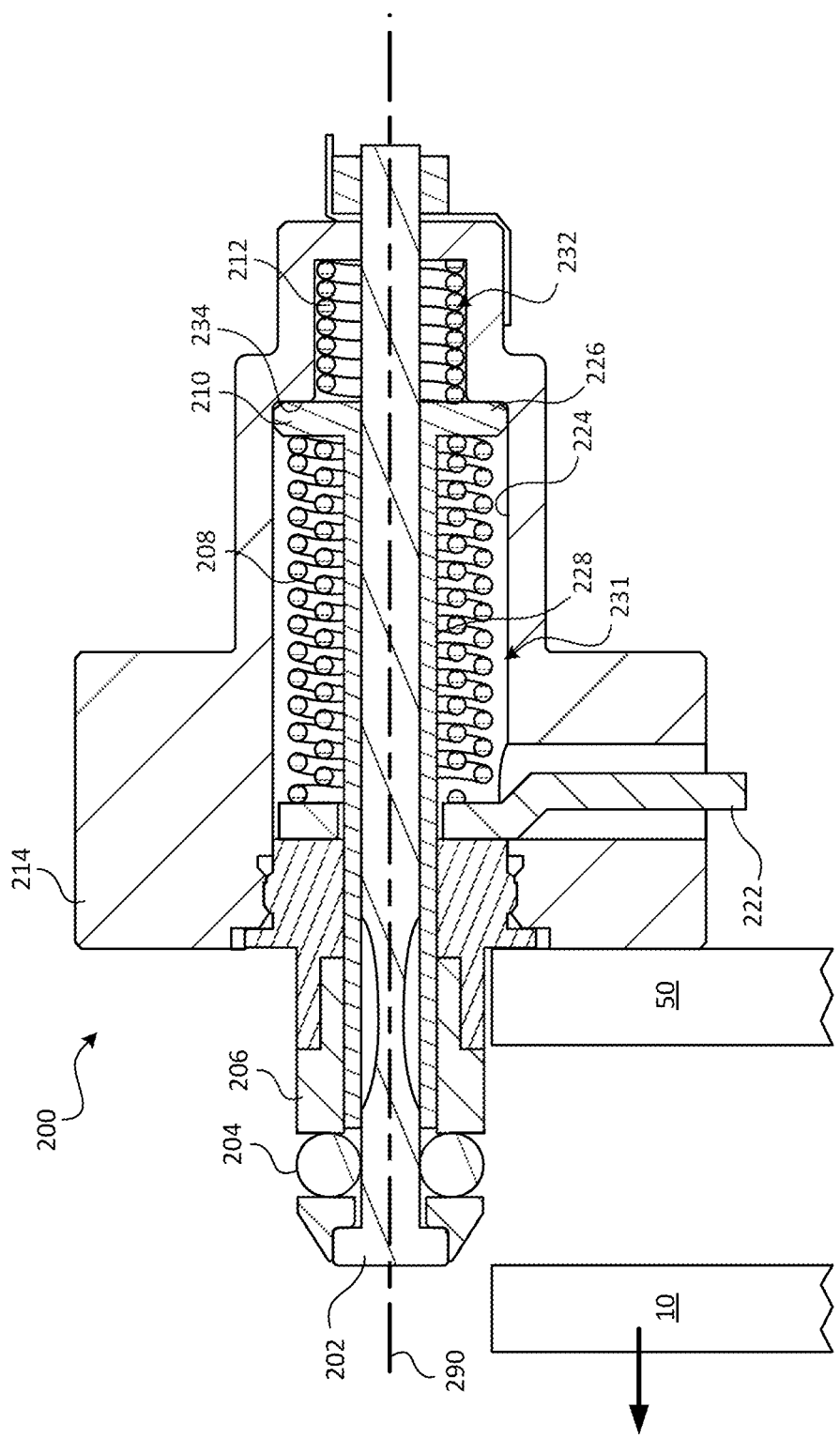
FIG. 5E illustrates a section view of the actuator of FIG. 5A in an unlocked state with the spindle in a retracted position, in accordance with various embodiments.

With particular focus on FIG. 5E, housing 214 comprises a main chamber 224. Spindle 210 may comprise a flange 226 which divides the main chamber 224 into a first portion 231 and a second portion 232. The SMA spring 208 may be disposed in the first portion 231 and the compression spring 212 may be disposed in the second portion 232. In this manner, SMA spring 208 may be energized, via electrical wire 222, which causes the SMA spring 208 to extend in length, thereby biasing the spindle 210 to retract into the housing 214 and compressing the compression spring 212 (see FIG. 5E). In response to SMA spring 208 being deenergized (i.e., SMA spring 208 is electrically decoupled from the power source), SMA spring 208 may decrease in length and compression spring 212 may increase in length (i.e., decompress) to bias the spindle 210 to extend from the housing 214 (see FIG. 5D).

With reference to FIG. 5D, SMA spring 208 is illustrated in a first state (also referred to herein as a deenergized state) with spindle 210 in an extended position and biasing ball bearings 204 outwards to project from nose fitting 206. In the first state, compression spring 212 overcomes the bias of SMA spring 208 and biases spindle 210 to the extended position. In various embodiments, in the extended position, a first end of spindle 210 may abut nose fitting 206 and a second end of spindle 210 may abut compression spring 212. Moreover, ball bearings 204 may abut the outer surface of spindle 210 to secure ball bearings 204 in the protruding position.

With reference to FIG. 5E, SMA spring 208 is illustrated in a second state (also referred to herein as an energized state) with spindle 210 in a retracted position. In the retracted position, spindle 210 is moved away from the ball bearings 204 to allow the ball bearings 204 to move inward toward longitudinal axis 290 and within the outer periphery of nose fitting 206. In the second state, SMA spring 208 overcomes the bias of compression spring 212 and biases spindle 210 to the retracted position. In various embodiments, ball bearings 204 may abut the outer surface of frangible rod 202 when SMA spring 208 is in the second state. In various embodiments, spindle 210 may abut a shoulder 234 of housing 214 when SMA spring 208 is in the second state. Shoulder 234 partially defines main chamber 224.

In various embodiments, spindle 210 comprises a hollow tube 228 extending longitudinally (i.e., parallel longitudinal axis 290) from flange 226. Frangible rod 202 may extend through hollow tube 228. Frangible rod 202 and hollow tube 228 may be concentrically positioned about longitudinal axis 290. In various embodiments, SMA spring 208 surrounds the spindle 210. SMA spring 208 may surround the hollow tube 228. SMA spring 208 may be disposed in main chamber 224 between flange 226 and nose fitting 206.

FIG. 5D and FIG. 5E schematically illustrate a portion of a packboard 50 and a portion of a blowout panel 10. Ball lock actuator 200 may be mounted to packboard 50. With the ball bearings 204 extending from the periphery of nose fitting 206, the ball bearings 204 may prevent the blowout panel 10 from moving longitudinally away from packboard 50, thereby securing the blowout panel 10 to the packboard 50. Stated differently, the blowout panel 10 may be clamped between the ball bearings 204 and the packboard 50. In response to the SMA spring 208 being energized, the spindle 210 retracting, and the ball bearings 204 retracting into the nose fitting 206, the blowout panel 10 may be released from packboard 50 (see FIG. 5E) to allow the inflatable evacuation slide to deploy.

With reference to FIG. 6A through FIG. 6D, a soft cover actuator 300 is illustrated, in accordance with various embodiments. Soft cover actuator 140 (see FIG. 2) may be similar to soft cover actuator 300, in accordance with various embodiments. Soft cover actuator 300 may include a nose fitting 306, a SMA spring 308, a spindle 310, a compression spring 312, and a housing 314.

Housing 314 may comprise a passage 320 for receiving electrical wire 322. Electrical wire 322 may carry electrical current from power source 160 (see FIG. 2) to SMA spring 308. In this manner, SMA spring 308 may vary in length in response to being electrically energized to translate spindle 310 along longitudinal axis 390 with respect to nose fitting 306 and housing 314 to actuate soft cover actuator 300 between a locked state (see FIG. 6C) and an unlocked state (see FIG. 6D).

Figure 6C:
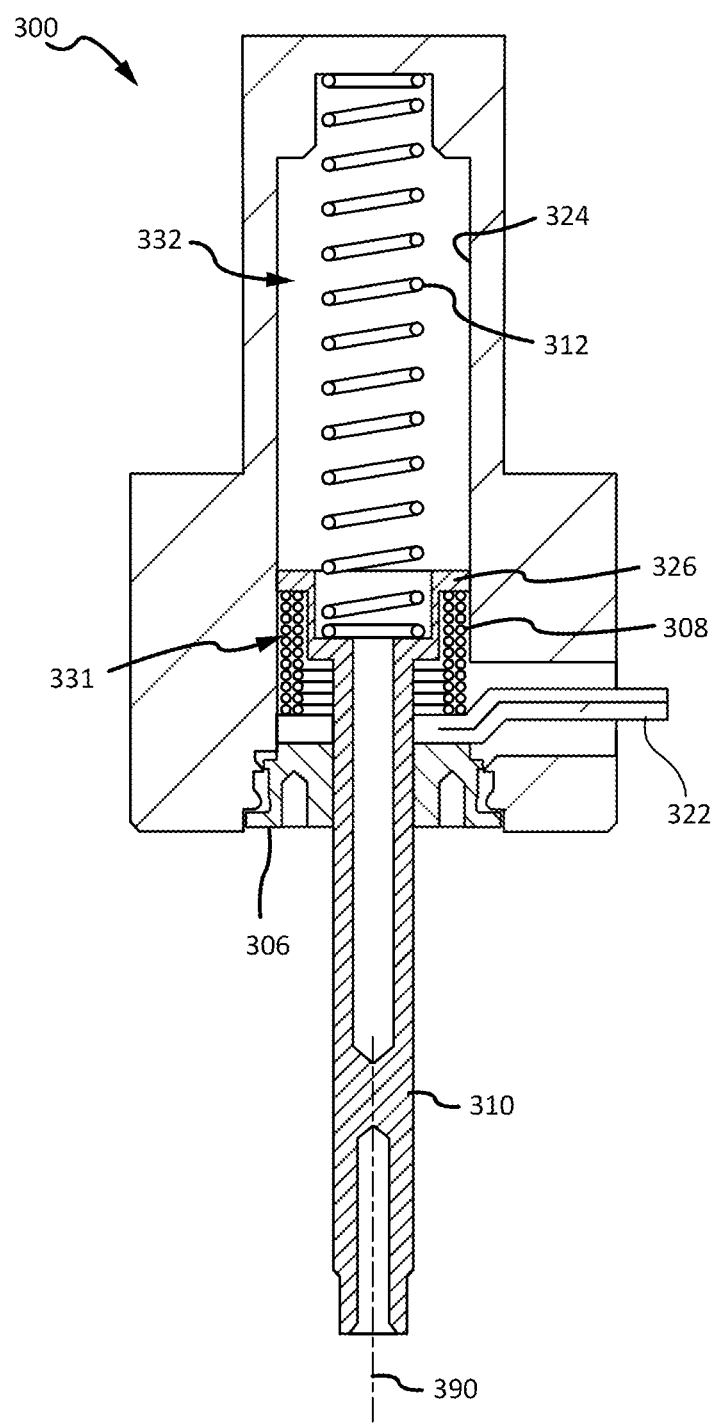
FIG. 6C illustrates a section view of the actuator of FIG. 6A in a locked stated with the spindle in an extended position, in accordance with various embodiments.

With particular focus on FIG. 6C, housing 314 comprises a main chamber 324. Spindle 310 may comprise a flange 326 which divides the main chamber 324 into a first portion 331 and a second portion 332. The SMA spring 308 may be disposed in the first portion 331 and the compression spring 312 may be disposed in the second portion 332. In this manner, SMA spring 308 may be energized, via electrical wire 322, which causes the SMA spring 308 to extend in length, thereby biasing the spindle 310 to retract into the housing 314 and compressing the compression spring 312 (see FIG. 6D). In response to SMA spring 308 being deenergized (i.e., SMA spring 308 is electrically decoupled from the power source), SMA spring 308 may decrease in length and compression spring 312 may increase in length (i.e., decompress) to bias the spindle 310 to extend from the housing 314 (see FIG. 6C).

With reference to FIG. 6C, SMA spring 308 is illustrated in a first state (also referred to herein as a deenergized state) with spindle 310 in an extended position and projecting longitudinally outwards from nose fitting 306. In the first state, compression spring 312 overcomes the bias of SMA spring 308 and biases spindle 310 to the extended position. In various embodiments, in the extended position, a first end of spindle 310 may extend from nose fitting 306 and a second end of spindle 310 may abut compression spring 312.

Figure 6D:
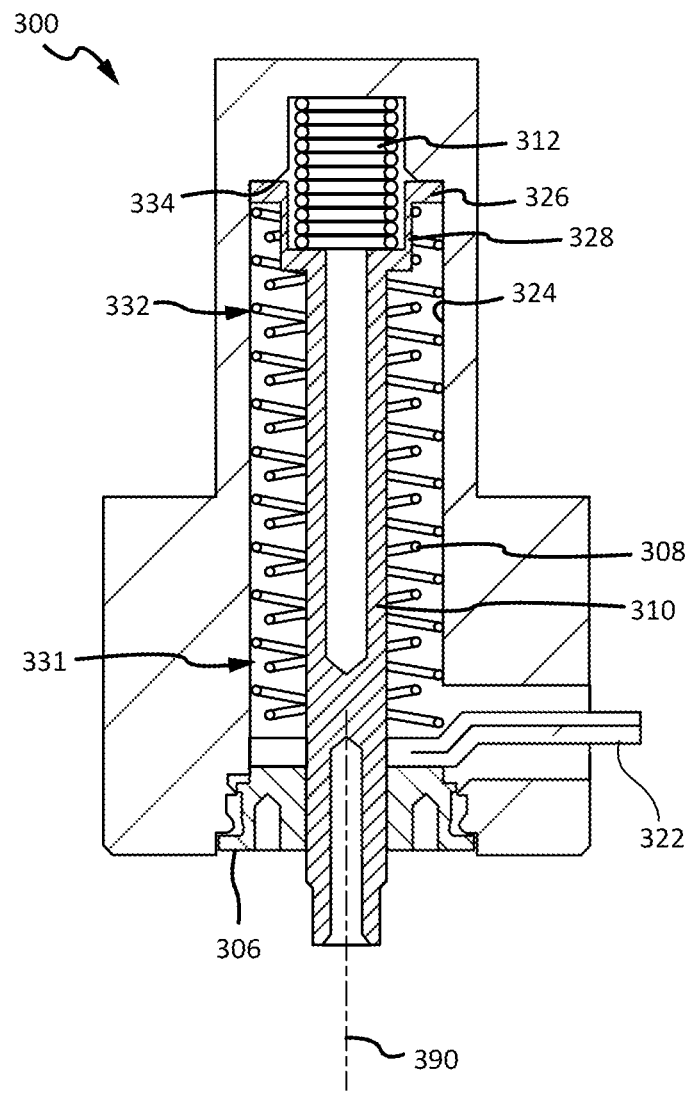
FIG. 6D illustrates a section view of the actuator of FIG. 6A in an unlocked state with the spindle in a retracted position, in accordance with various embodiments.

With reference to FIG. 6D, SMA spring 308 is illustrated in a second state (also referred to herein as an energized state) with spindle 310 in a retracted position. In the second state, SMA spring 308 overcomes the bias of compression spring 312 and biases spindle 310 to the retracted position. In various embodiments, spindle 310 may abut a shoulder 334 of housing 314 when SMA spring 308 is in the second state. Shoulder 334 partially defines main chamber 324.

In various embodiments, spindle 310 comprises a hollow tube 328 extending longitudinally (i.e., parallel longitudinal axis 390) from flange 326. Compression spring 312 may extend into hollow tube 328. In this manner, compression spring 312 is secured in the installed position with respect to housing 314 and spindle 310. Compression spring 312 and hollow tube 328 may be concentrically positioned about longitudinal axis 390.

With combined reference to FIG. 6C, FIG. 6D, and FIG. 3, spindle 310 may be configured to couple to the key-loop or pin 126 of the lacing 124. The arm of the soft cover actuator 140 (e.g., spindle 310 of soft cover actuator 300) may be in an extended position when the soft cover actuator 140 is deenergized (i.e., when the SMA spring 308 is deenergized (e.g., relaxed and/or compressed)). Upon electrically energizing the soft cover actuator 140 (e.g., energizing the SMA spring 308), the arm of the soft cover actuator 140 may retract into the housing (e.g., spindle 310 may retract into housing 314), thus sliding the pin 126 or otherwise unlocking the key-loop of the lacing 124 to allow the lacing 124 to unfurl and release the evacuation slide 122 from the soft cover 120.

With reference to FIG. 7A through FIG. 7C, a SMA spring 408 is illustrated, in accordance with various embodiments. SMA spring 208 (see FIG. 5A) and/or SMA spring 308 (see FIG. 6A) may be similar to SMA spring 408, in accordance with various embodiments. SMA spring 408 may comprise two concentrically oriented helical coils connected at a first end 401 and terminating at a second end 402. In this manner, SMA spring 408 may be referred to herein as a double coil spring comprising an inner coil 404 and an outer coil 406. The outer coil 406 and inner coil 404 may wind in different directions. For example, if the outer coil 406 is a right-hand winding, then the inner coil 404 is a left-hand winding, or vice versa.

Both ends of SMA spring 408 may be located at second end 402. In this manner, electric wires may be attached at a common location (e.g., at the same end of SMA spring 408) for ease of routing wires to SMA spring 408. For example, passage 220 (see FIG. 5A) may be located at second end 402 of SMA spring 408. In FIG. 7A, a circuit diagram of a power source is schematically shown coupled to the SMA spring 208. A first terminus 411 of the inner coil 404 may be coupled to a first terminal (e.g., a negative terminal in the illustrated embodiment) of the power source and a second terminus 412 of the outer coil 406 may be coupled to a second terminal (e.g., a positive terminal in the illustrated embodiment) of the power source. It should be understood that the polarity of the SMA spring 408 may be reversed as desired without departing from the scope of the present disclose. In this manner, electric current may be supplied to the SMA spring 408.

With reference to FIG. 7B, SMA spring 408 is illustrated in a relaxed stated (i.e., without being energized). SMA spring 408 may comprise a first length 421 in the relaxed state.

With reference to FIG. 7C, SMA spring 408 is illustrated in an energized stated. SMA spring 408 may comprise a second length 422 in the energized state. The second length 422 is greater than the first length 421. SMA spring 408 may increase in length to a predefined length (e.g., second length 422) when electrically energized and may gradually return to its default length (e.g., first length 421) after the electricity is cut-off. When the power supply circuit is closed, the electrical current flows through the SMA spring 408 heating it due to the resistance inherent in the SMA material of which the SMA spring 408 is made. Heating of the SMA spring 408 to a sufficient temperature may cause the SMA material properties to change from martensite to austenite crystalline structure, which causes a length change in the SMA spring 408. Changing the electrical current changes the temperature and therefore changes the length of the SMA spring 408, which is used to actuate and de-actuate the actuator (e.g., blowout panel actuator 142 and/or soft cover actuator 140 of FIG. 2) to control the movement of the actuator in at least the longitudinal direction (e.g., parallel to longitudinal axis 290 of FIG. 5D and/or longitudinal axis 390 of FIG. 6C). In various embodiments, SMA spring 408 comprises a nickel-titanium alloy.

Figure 8:
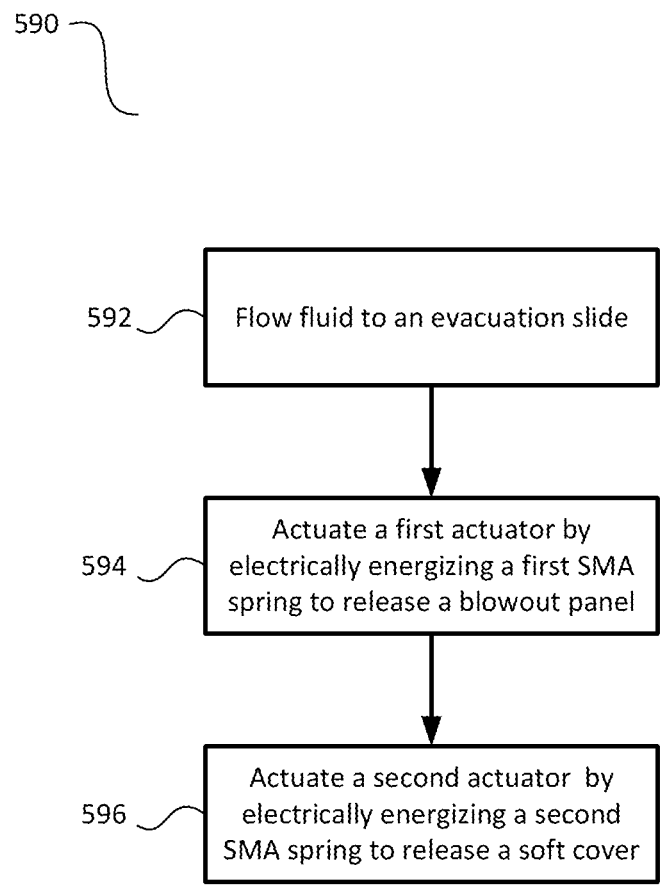
FIG. 8 illustrates a schematic flow chart diagram of a method of deploying an evacuation slide of an aircraft, in accordance with various embodiments.

FIG. 8 illustrates a schematic flow chart diagram of a method 590 of deploying an evacuation slide of an aircraft, in accordance with various embodiments. The method 590 may include flowing fluid from a fluid source, such as the charged tank 144, to the evacuation slide via the fluid delivery manifold 130 at step 592. The method 590 may further include actuating a first actuator by electrically energizing the SMA spring of the first actuator to release a blowout panel at step 594 and actuating a second actuator by electrically energizing the SMA spring of the second actuator to release a soft cover at step 596.

In various embodiments, flowing the fluid from the fluid source to the evacuation slide (step 592), actuating the first actuator (step 594), and actuating the second actuator (step 596) may occur substantially simultaneously in response to an evacuation event. In various embodiments, actuating the first actuator (step 594) and actuating the second actuator (step 596) may occur electronically.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A release system for an evacuation slide assembly of an aircraft, the release system comprising:
   a blowout panel; and
   a first actuator comprising a first housing, a first shape memory alloy spring, a first compression spring, and a first spindle;
   wherein the first shape memory alloy spring is configured to bias the first spindle to retract into the first housing in response to being electrically energized to deploy the blowout panel.

2. The release system of claim 1, further comprising a power source, wherein the first shape memory alloy spring is configured to be electrically energized in response to an evacuation event.

3. The release system of claim 2, further comprising:
   a soft cover; and
   a second actuator comprising a second housing, a second shape memory alloy spring, a second compression spring, and a second spindle;
   wherein the second shape memory alloy spring is configured to bias the second spindle to retract into the second housing in response to being electrically energized to deploy the soft cover.

4. The release system of claim 3, further comprising:
   a control unit;
   a first switch coupled between the power source and the first actuator; and
   a second switch coupled between the power source and the second actuator;
   wherein the control unit is configured to close the first switch and the second switch in response to the evacuation event to energize the first SMA spring and the second SMA spring.

5. The release system of claim 1, wherein the first actuator is a ball lock, the first actuator further comprising a ball bearing, and the first shape memory alloy spring is configured to bias the first spindle away from the ball bearing in response to being electrically energized.

6. The release system of claim 5, wherein the first actuator further comprises a frangible rod configured to extend through the first spindle.

7. The release system of claim 6, wherein the first actuator further comprises a first nose fitting coupled to the first housing, wherein the first shape memory alloy spring is disposed in a first main chamber of the first housing, the first shape memory alloy spring is disposed between a first flange of the first spindle and the first nose fitting.

8. The release system of claim 1, wherein:
in a locked state the first actuator is configured to secure the blowout panel; and
in response to being electrically energized, the first actuator is configured to transition to an unlocked state to release the blowout panel.

9. The release system of claim 3, wherein:
in a locked state the second actuator is configured to retain an evacuation slide enclosed within the soft cover; and
in response to being electrically energized, the second actuator is configured to transition to an unlocked state to allow release of the evacuation slide from enclosure within the soft cover.

10. The release system of claim 9, wherein the second actuator is configured to release a key-loop of a lacing to allow the lacing to unfurl.

11. An evacuation slide assembly of an aircraft, the evacuation slide assembly comprising:
an evacuation slide mounted to the aircraft;
a charged tank fluidly coupled to the evacuation slide, wherein fluid is configured to flow from the charged tank to the evacuation slide in response to an evacuation event;
a power source;
a blowout panel for retaining the evacuation slide;
a first actuator comprising a first shape memory alloy spring configured to be electrically energized by the power source, wherein the first actuator is configured to release the blowout panel in response to a first electric current flowing from the power source to the first shape memory alloy spring;
a soft cover for retaining the evacuation slide; and
a second actuator comprising a second shape memory alloy spring configured to be electrically energized by the power source, wherein the second actuator is configured to release the soft cover in response to a second electric current flowing from the power source to the second shape memory alloy spring.

12. The evacuation slide assembly of claim 11, further comprising a packboard mounted to the aircraft, wherein the packboard comprises a packboard compartment.

13. The evacuation slide assembly of claim 12, wherein the evacuation slide is mounted to the packboard.

14. The evacuation slide assembly of claim 13, wherein the blowout panel extends across an opening of the packboard compartment, wherein the first actuator, in a first locked state, secures the blowout panel relative to the packboard to retain the evacuation slide within the packboard compartment.

15. The evacuation slide assembly of claim 14, wherein the soft cover is disposed within the packboard compartment and comprises lacing, wherein the second actuator, in a second locked state, retains the evacuation slide within the soft cover.

16. The evacuation slide assembly of claim 12, further comprising a valve for controlling flow of the fluid from the charged tank.

17. The evacuation slide assembly of claim 11, wherein the first actuator further comprises a first housing, a first compression spring, and a first spindle, wherein the first shape memory alloy spring surround the first spindle and abuts a flange of the first spindle.

18. A method of deploying an evacuation slide of an aircraft, the method comprising:
flowing fluid from a fluid source to the evacuation slide;
actuating a first actuator by flowing electrical current from a power source to a first shape memory alloy spring of the first actuator to release a blowout panel; and
actuating a second actuator by flowing electrical current from the power source to a second shape memory alloy spring of the second actuator to release a soft cover.

19. The method of claim 18, wherein flowing the fluid from the fluid source to the evacuation slide, actuating the first actuator, and actuating the second actuator occur substantially simultaneously in response to an evacuation event.

20. The method of claim 18, wherein, in response to flowing electrical current from the power source to the first shape memory alloy spring, the first shape memory alloy spring is configured to bias a first spindle to retract into a first housing.

* * * * *